(12) United States Patent
Kawahara et al.

(10) Patent No.: US 7,619,610 B2
(45) Date of Patent: Nov. 17, 2009

(54) DISPLAY DEVICE AND DISPLAY METHOD

(75) Inventors: Jun Kawahara, Minamiashigara (JP); Rie Ishii, Minamiashigara (JP); Takayuki Takeuchi, Kanagawa (JP); Hiroaki Moriyama, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 681 days.

(21) Appl. No.: 11/352,795

(22) Filed: Feb. 13, 2006

(65) Prior Publication Data
US 2006/0290653 A1    Dec. 28, 2006

(30) Foreign Application Priority Data
Jun. 22, 2005    (JP)    ............... 2005-182408

(51) Int. Cl.
*G09G 3/34*    (2006.01)
(52) U.S. Cl. ........................ 345/107; 345/87
(58) Field of Classification Search ............ 345/82–85; 315/1.1–169.3
See application file for complete search history.

(56) References Cited

U.S. PATENT DOCUMENTS

| 4,126,854 | A |   | 11/1978 | Sheridon |
| 4,740,785 | A | * | 4/1988 | Stroomer et al. ............... 345/85 |
| 4,965,562 | A | * | 10/1990 | Verhulst ....................... 345/85 |
| 5,004,322 | A | * | 4/1991 | Verhulst et al. ............. 359/230 |
| 6,727,873 | B2 | * | 4/2004 | Gordon et al. ................ 345/88 |
| 6,727,883 | B2 | * | 4/2004 | Uno et al. .................... 345/107 |
| 2002/0000959 | A1 | * | 1/2002 | Colgan et al. ................. 345/84 |
| 2004/0252363 | A1 | * | 12/2004 | Matsuda ..................... 359/296 |
| 2004/0263946 | A9 | * | 12/2004 | Liang et al. ................. 359/296 |

FOREIGN PATENT DOCUMENTS

| JP | 56-88173 | 7/1981 |
| JP | 10-35095 | 2/1998 |
| JP | 10-44592 | 2/1998 |
| JP | 11-202804 | 7/1999 |

\* cited by examiner

*Primary Examiner*—Richard Hjerpe
*Assistant Examiner*—Carolyn R Edwards
(74) *Attorney, Agent, or Firm*—Fildes & Outland, P.C.

(57) ABSTRACT

A display device of the present invention comprises display unit cells having a display region that shows coloration, a shield region that shields the coloration, and a horizontal projection surface area adjustment unit that relatively changes the horizontal projection surface area in the display region by increasing or decreasing the shielding region; and a display method using the display device.

7 Claims, 6 Drawing Sheets

DISPLAY DEVICE AND DISPLAY METHOD

CROSS-REFERENCE TO RELATED APPLICATION

This application claims priority under 35 USC 119 from Japanese Patent Application No 2005-182408, the disclosure of which is incorporated by reference herein.

BACKGROUND OF THE INVENTION

1. Field of the Invention

The present invention relates to a display device usable for optical elements such as a light control glass, a light control element, a display element, and a display method using the display device.

2. Description of the Related Art

Along with the advancement of a highly information-oriented society, there has been an increased need for electronic paper systems, color display systems, and large surface area display systems.

Particularly, there is great need for next-generation electronic paper display systems. However, presently no promising technology has been established get for satisfying the need. Possible known method include a liquid crystal method, an electrophoresis method, and a twist ball method, and the like.

The liquid crystal method utilizes a polarization plate. Therefore, light utilization factor is low, resulting in problems in that the reflectivity is decreased, making it difficult to display images with high quality.

As a display device employing the electrophoresis method, for example, a display device having a structure formed by sealing a plurality of electrically charged and colored electrophoresis particles and an insulating liquid in which coloring material with different coloration from those of the electrophoresis particles is dissolved between substrates is disclosed in Japanese Patent Application Laid-Open (JP-A) No 11-202804. In this device, images are displayed by transferring electrophoresis particles in accordance with the voltage applied between the substrates and showing contrast between the electrophoresis particles and the insulating liquid. However, the device has problems in that replacement of a plurality of colored electrophoresis particles is sometimes incomplete so that light leakage among particles takes place, and the contrast and the reflectivity deteriorate owing to the electrode structure.

Further, as a display device employing the twist ball method, a rotating twist ball or Gyricon display device has been known. This device comprises dichroic balls each having a first color (e.g. white color) in approximately a half or 50% of the sphere and a second different color in the other half of the sphere (e.g. black color). These dichroic balls are suspended in liquid hollow parts in an elastomer or polymer sheet sandwiched between glass or plastic films. For example, U.S. Pat. No. 4,126,854 describes that in a device having such a structure, the dichroic balls rotate along with their electric anisotropy or bipolar to form images. However, this display device has low optical density. Further, due to the difficulty in controlling in the rotation and obtaining a precise dichroic property, there is a problem in that neither high reflectivity nor high contrast can be obtained.

In addition, as a display device other than the aforementioned methods, JP-A No. 56-88173 discloses a device having a mechanism of utilizing an electrophoresis of a liquid material to a porous body and scattering outside light by controlling the content of the liquid in the surface of the porous body. However, the display device with this mechanism has a display structure in which one surface part of the porous body is exposed. Therefore, it is poor in portability and cannot be applied to electronic paper.

Further, JP-A Nos. 10-35095 and 10-44592 disclose recording methods and recording media for forming images by moving ink materials by outside forcible forces such as electroosmosis to visible regions in the surfaces of the porous layers and eliminating the images by moving the ink materials by outside forcible forces to invisible regions. However, these recording methods and recording devices have a problem cannot be done in that the images to be displayed are predetermined and re-writing.

SUMMARY OF THE INVENTION

The present invention has been made in view of the above circumstances and provides a display device and a display method.

According to an aspect of the invention, a display device comprises display unit cells having a display region that shows coloration, a shield region that shields the coloration, and a horizontal projection surface area adjustment unit that relatively changes the horizontal projection surface area in the display region by increasing or decreasing the shielding region.

According to another aspect of the invention, a display device comprises display unit cells having: a colored liquid; a first space capable of holding the colored liquid in a visible state; a second space connecting with the first space, shielded with a reflection plate, and capable of holding the colored liquid in an invisible state; and an interface surface area adjustment unit that relatively changes the interface surface area of the colored liquid held in the first space by increasing or decreasing the amount of the colored liquid held in the second space; wherein the interface surface area adjustment device comprises a pair of electrodes provided in the second space and a solid medium in which electroosmostic flow of liquid occurs when subjected to an electric field in which the colored liquid can undergo electroosmosis, and moves the colored liquid between the first space and the second space through the solid medium in which electroosmostic flow of liquid occurs when subjected to an electric field by a voltage applied between the pair of electrodes.

According to another aspect of the invention, a display device comprises display unit cells having: a colored liquid; a first space capable of holding the colored liquid in a visible state; a second space connecting with the first space and capable of holding the colored liquid in an invisible state, a third space including the second space and shielded with a reflection plate; and an interface surface area adjustment unit that relatively changes the interface surface area of the colored liquid held in the first space by increasing or decreasing the amount of the colored liquid held in the second space; wherein the interface surface area adjustment device comprises a first electrode substrate and a second electrode substrate disposed face to face in the third space, and a deformable third electrode substrate disposed between the first electrode substrate and the second electrode substrate, and the second space is formed between the first electrode substrate and the third electrode substrate, and the device moves the colored liquid between the first space and the second space by the deformation of the third electrode substrate by a voltage applied between the first electrode substrate and the second electrode substrate.

According to another aspect of the invention, a display device comprises display unit cells having: a colored substance; a first space capable of holding the colored substance in a visible state; a second space connecting with the first space, shielded with a penetrable plate, and capable of holding the colored substance in an invisible state; and a horizontal projection surface area adjustment unit that relatively changes the horizontal projection surface area of the colored substance held in the first space by changing the amount of the colored substance held in the second space, wherein the horizontal projection surface area adjustment device comprises a movable substrate connected to the colored substance and a driving unit that moves the movable substrate, and the device moves the colored substance between the first space and the second space by moving of the movable substrate.

According to another aspect of the invention, a display method using display unit cells have a display region that shows coloration and a shield region that shields the coloration, wherein a horizontal projection surface area in the display region is relatively changed by increasing or decreasing the shielding region.

DETAILED DESCRIPTION OF THE INVENTION

Figure 1:
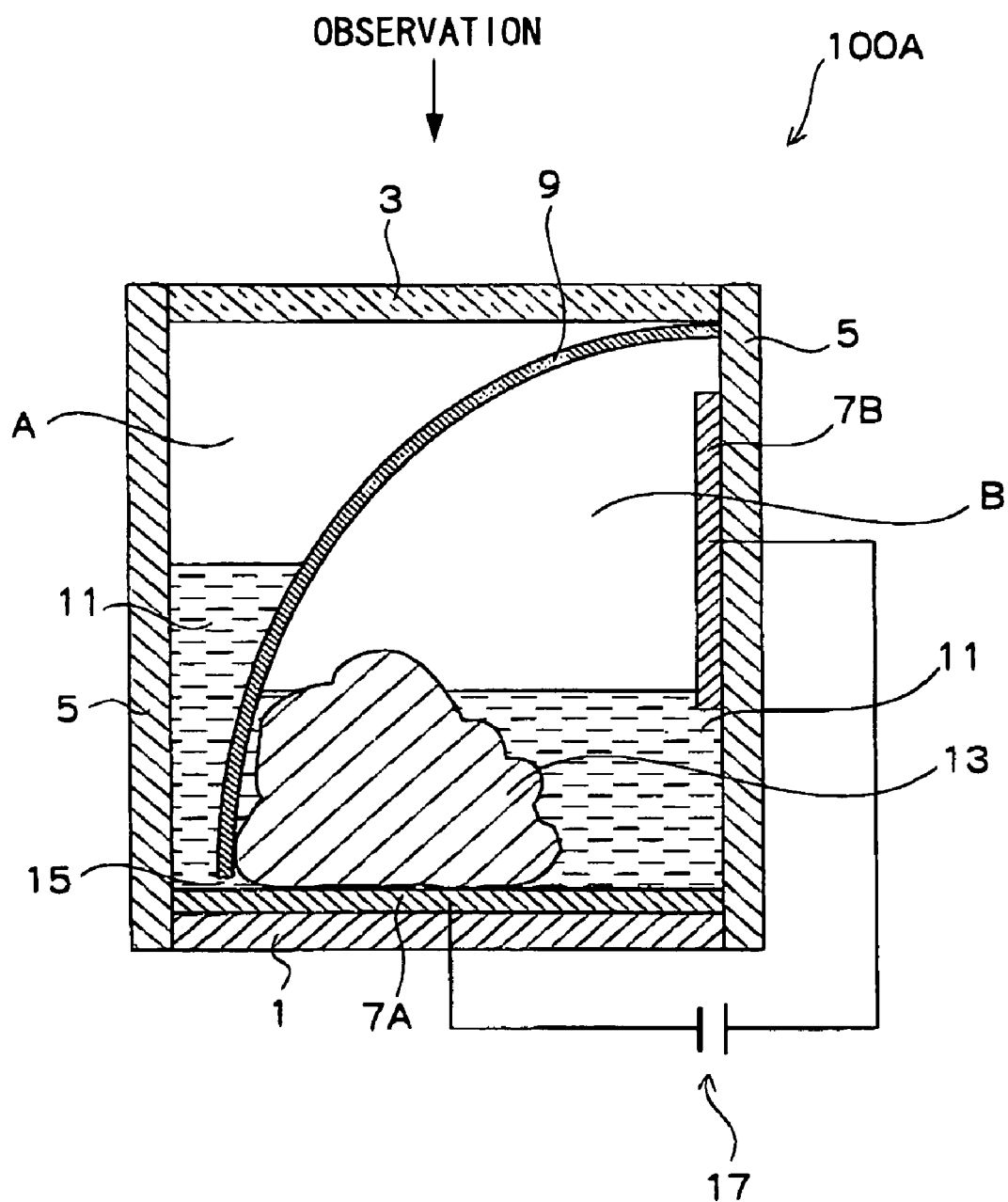
FIG. 1 is a schematic cross-sectional view showing a first embodiment of a display unit cell of a display device of the present invention.

Hereinafter, the present invention will be described more in details.

Display Device

The first display device of the invention comprises a display region that shows coloration, a shield region that shields the coloration, and a horizontal projection surface area adjustment unit that relatively changes the horizontal projection surface area in the display region by increasing or decreasing the shielding region.

That is, with respect to the display device of the first embodiment of the invention, in the case where of a plane view of the display surface, each display unit cell is composed of the display region and the shielding region. Further, the horizontal projection surface area in the display region is relatively changed by increasing or decreasing the horizontal projection surface area of the shielding region. Herein, "horizontal" in the horizontal projection surface area in the present invention means a right angle to an arbitrary observation direction.

In such a display device, the display region can be shielded entirely by the shielding region. In such a case, the horizontal projection surface area in the display region can be 0%. Also, the display region is not shielded by the shielding region. In such a case, the horizontal projection surface area in the display region can be 100%. Therefore, display and non-display can be selected and rewriting of a display image is made possible. Further, it is possible to give high contrast. Also, if the shielding region is formed using a material having excellent reflection property, it is possible to achieve an image having a high reflectivity.

Further, in order to the coloration of the display region is shown by the colored liquid, the display region can be composed so that the surface area of the liquid interface corresponding to the amount of the colored liquid may be the horizontal projection surface area in the display region. The amount of the colored liquid is adjusted by electroosmosis through the solid medium in which electroosmostic flow of liquid occurs when subjected to an electric field.

The second display device of the invention comprises display unit cells having: a colored liquid; a first space capable of holding the colored liquid in a visible state; a second space connecting with the first space, shielded with a reflection plate, and capable of holding the colored liquid in an invisible state; and an interface surface area adjustment unit that relatively changes the interface surface area of the colored liquid held in the first space by increasing or decreasing the amount of the colored liquid held in the second space. In the second display device, the interface surface area adjustment device comprises a pair of electrodes provided in the second space and a solid medium in which electroosmostic flow of liquid occurs when subjected to an electric field in which the colored liquid can undergo electroosmosis. And the interface surface area adjustment device moves the colored liquid between the first space and the second space through the solid medium in which electroosmostic flow of liquid occurs when subjected to an electric field by a voltage applied between the pair of electrodes.

In the second display device of the invention, the horizontal projection surface area in the display region in the aforementioned first display device corresponds to the interface surface area of the colored liquid held in the first space. The interface surface area can be changed by moving the colored liquid between the first space and the second space. Also, the exposed surface area of the reflection plate forming the second space corresponds to the shielding region in the first display device.

In such a display device, display and non-display of the colored liquid (display region) can be selected by adjusting the amount of the colored liquid in the first space. Accordingly, rewriting of display images is made possible.

In the second display device of the invention, the display region is composed of a colored liquid in the first space and the shielding region is composed of a reflection plate forming the second space, so that high reflectivity and high contrast can be achieved.

The third display device of the invention comprises display unit cells having: a colored liquid; a first space capable of holding the colored liquid in a visible state; a second space connecting with the first space and capable of holding the colored liquid in an invisible state; a third space including the second space and shielded with a reflection plate; and an interface surface area adjustment unit that relatively changes the interface surface area of the colored liquid held in the first space by increasing or decreasing the amount of the colored liquid held in the second space. In the third display device of the invention, the interface surface area adjustment device comprises a first electrode substrate and a second electrode substrate disposed face to face in the third space, and a deformable third electrode substrate disposed between the first electrode substrate and the second electrode substrate. And the second space is formed between the first electrode substrate and the third electrode substrate, the interface surface area adjustment device moves the colored liquid between the first space and the second space by the deformation of the third electrode substrate by a voltage applied between the first electrode substrate and the second electrode substrate.

In the third display device of the invention, the interface surface area of the colored liquid held in the first space corresponds to the horizontal projection surface area in the display region in the aforementioned first display device. The interface surface area can be changed by moving the colored liquid between the first space and the second space. The exposed surface area of the reflection plate forming the third space corresponds to the shielding region of the first display device.

In such a display device, display and non-display of the colored liquid (display region) can be selected by adjusting the amount of the colored liquid in the first space. Accordingly, rewriting of display images is made possible.

In the third display device of the invention, the display region is composed of a colored liquid in the first space and the shielding region is composed of a reflection plate forming the third space, so that high reflectivity and high contrast can be achieved.

The fourth display device of the invention comprises display device comprising display unit cells having; a colored substance; a first space capable of holding the colored substance in a visible state; a second space connecting with the first space, shielded with a penetrable plate, and capable of holding the colored substance in an invisible state; and a horizontal projection surface area adjustment unit that relatively changes the horizontal projection surface area of the colored substance held in the first space by changing the amount of the colored substance held in the second space. In the fourth display device of the invention, the horizontal projection surface area adjustment device comprises a movable substrate connected to the colored substance and a driving unit that moves the movable substrate. The horizontal projection surface area adjustment device moves the colored substance between the first space and the second space by moving of the movable substrate.

In the fourth display device of the invention, the horizontal projection surface area of the colored substance held in the first space corresponds to the horizontal projection surface area in the display area of the aforementioned first display device. The horizontal projection surface area can be changed by moving the colored substance between the first space and the second space. The visible surface area of the penetrable plate forming the second space corresponds to the shielding region of the first display device.

In such a display device, display and non-display of the colored substance can be selected by adjusting the horizontal projection surface area of the colored substance in the first space, accordingly, rewriting of display images is made possible.

In the fourth display device of the invention, the display region is composed of a colored substance in the first space and the shielding region is composed of a penetrable plate forming the second space, so that high reflectivity and high contrast can be achieved by using a high reflective material for the penetrable plate.

The first to the fourth display devicees of the invention can be adjustable in the horizontal projection surface areas of the display regions (the interface surface area of the colored liquid) in a range of 0 to 100% in a continuous manner. As a result, with respect to the display devicees of the invention, continuous gradation expression is made possible in each display unit cell (pixel).

Hereinafter, a display device of the invention will be described more practically with reference to drawings. Also, together with the display device of the invention, a display method of the display device will be described.

FIG. 1 is a schematic cross-sectional view showing a first embodiment of a display unit cell of the display device of the invention. The first embodiment of the display unit cell shows the display unit cell of the aforementioned second display device of the invention. Hereinafter, the same symbols are assigned to the members having the same function in all of the drawings and explanation of them will be omitted.

As shown in FIG. 1, the display device (display unit cell) 100A comprises a cell surrounded with a back surface substrate 1, a transparent substrate 3, partitioning wall 5 and curved reflection plate 9. The curved reflection plate 9 is placed so as to cover half or more of the capacity of the cell, which is surrounded by the back surface substrate 1, the transparent substrate 3, and the partitioning wall S.

The space A in which a colored liquid 11 exists (is held) on the reflection plate 9 is "a display region" or "the first space" since the coloration of the colored liquid 11 is observed when it is observed from the direction shown by an arrow in the drawing.

On the other hand, in the space B covered with the reflection plate 9, that is, a space surrounded with the reflection plate 9, the back surface substrate 1, and the partitioning wall 5, only the reflection plate 9 is observed when it is observed from the direction shown by an arrow in the drawing. In the space B covered with the reflection plate 9, the coloration is not observed even if the colored liquid 11 exists (is held) in the space B. Therefore, the space B is "a shielding region" or "the second space".

As shown in FIG. 1, in the space B, the first electrode 7A is disposed while it is brought into contact with the back surface substrate 1 and a second electrode 7B is disposed while it is brought into contact with the partitioning wall 5. And the first electrode 7A and the second electrode 7B are connected with a voltage application device 17. Further, a solid medium 13 to be electroosmosed is disposed on the second electrode 7B and in the vicinity of a connection path 15. Owing to the actions of these members, the colored liquid 11 can be moved between the space A and the space B. Accordingly, the horizontal projection surface area (the interface surface area of the colored liquid existing in the space A) in the display region can be adjusted.

That is, the horizontal projection surface area adjustment device (interface surface area adjustment device) is composed of the first electrode 7A, the second electrode 7B, and the solid medium 13 to be electroosmosed disposed in the space B.

Movement of the colored liquid 11 will be described particularly.

At first, when negative voltage is applied to the first electrode 7A by the voltage application device 17, the colored liquid 11 undergoes electroosmosis the first electrode 7A side through the solid medium 13 to be electroosmosed, so that it moves to the space A to cover the reflection plate 9.

For example, when the colored liquid 11 is colored black, the display unit cell 100A can display black color. Also, when negative voltage is applied to the second electrode 7B by the voltage application device 17, the colored liquid 11 which exists in the space A and covers the reflection plate 9 moves to the space B by undergoing electroosmosis to the second electrode 7B side through the solid medium 13 to be electroosmosed. For example, when the reflection plate 9 is white, the display unit cell 100A can display white color.

In such a manner, application of voltage to either electrodes 7A or 7B, electroosmosis of the colored liquid 11 is caused to move the colored liquid 11 between the space A or the space B.

Figure 2:
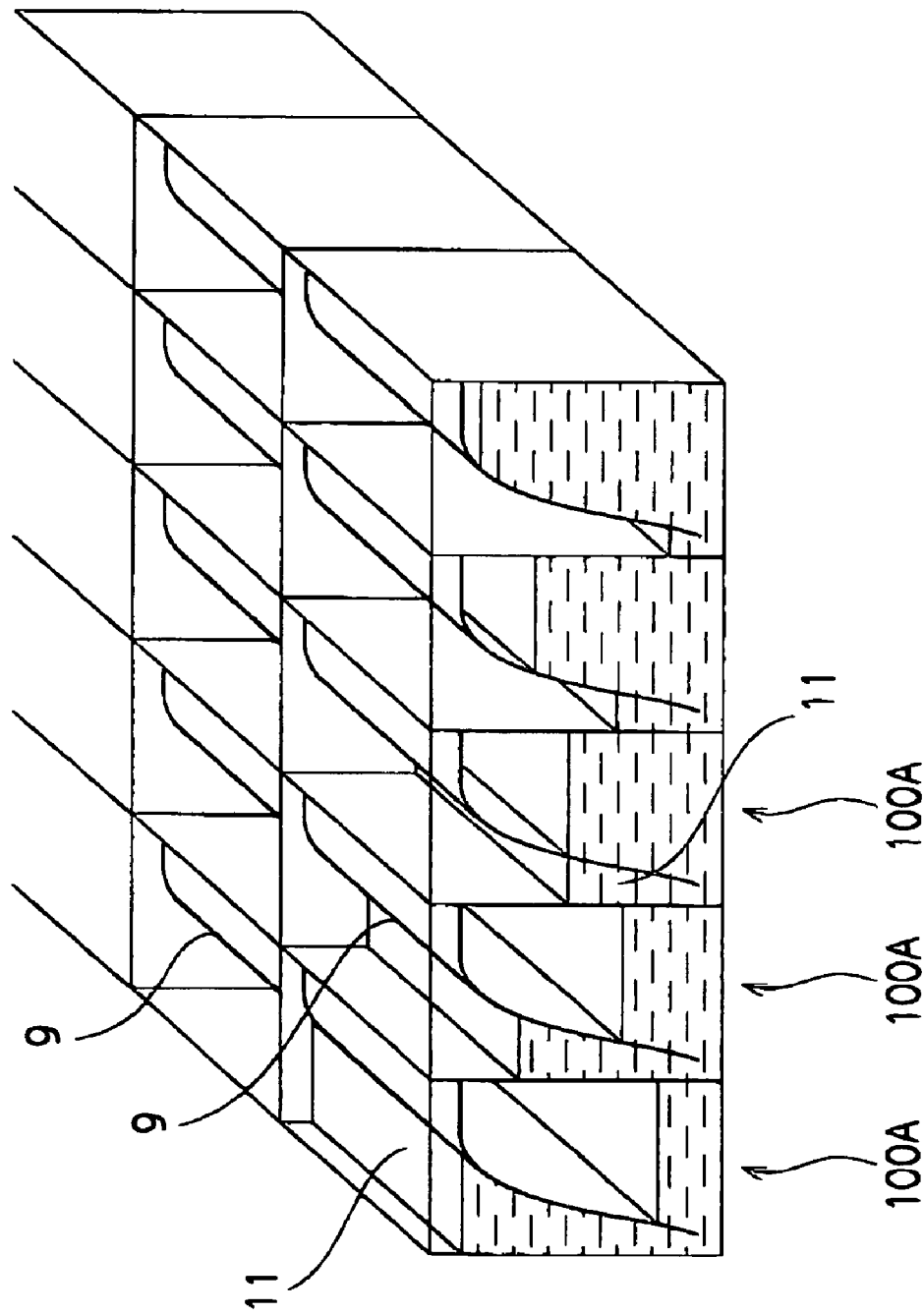
FIG. 2 is a schematic perspective view showing a plurality of arranged display unit cells of the display device shown in FIG. 1.

FIG. 2 shows a plurality of such display unit cells 100A of the display devicees. Herein, explanations of the respective component members will be omitted, however as described above, the each display unit cells 100A can display a desired gradation expression by adjusting the amount of the colored liquid 11 existing in the space A and the display device comprising a plurality of display unit cells 100A can display images with fine color density. And the image has excellent contrast. Therefore display images with high quality can be obtained.

Next, with reference to FIG. 3, a production method of the display unit cell 100A of the invention will be described.

At first, the first electrode 7A is formed on the back surface substrate 1. In the same manner, the second electrode 7B is formed on a part of the partitioning wall 5. Two electrode substrates thus obtained are stuck vertically to each other by heat as shown in FIG. 3A.

Figure 3A:
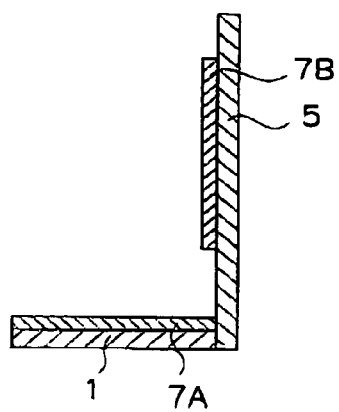
FIG. 3A to 3D are schematic views for explaining the process of producing the display unit cell shown in FIG. 1.

Next, as shown in FIG. 3A, the solid medium 13 to be electroosmosed is arranged on the first electrode 7A, and thereon a white reflection plate 9 is formed to cover it. Herein, one side of the reflection plate 9 is fused with the partitioning wall 5 and the other side is places so as not to have a contact with the first electrode 7A to form a connection path 15.

Figure 3B:
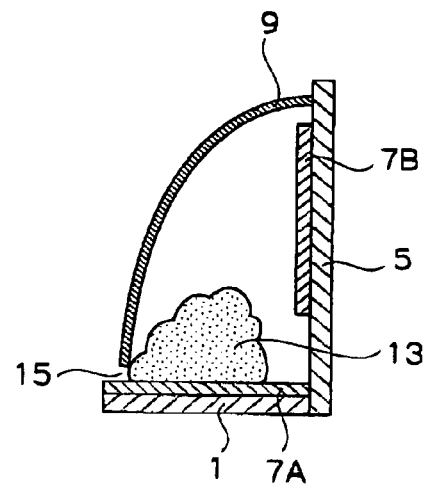
Figure 3C:
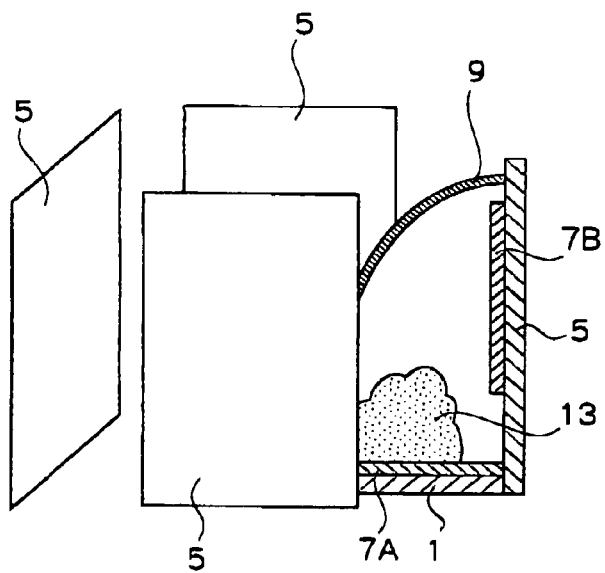
Figure 3D:
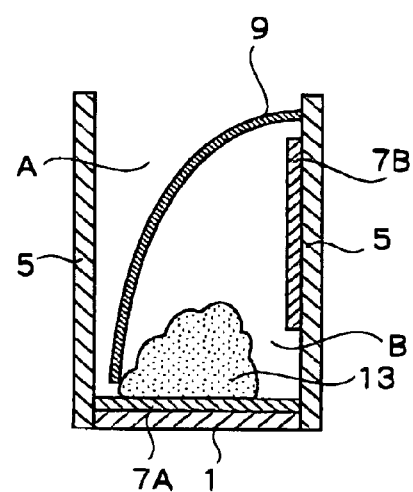

Subsequently, as shown in FIG. 3C and FIG. 3D, the side of the back surface substrate 1 besides the side fused with the partitioning wall 5 having the second electrode 7B is fused with another partitioning wall 5 made of the same material to form a cell. In this case, both sides existing in the front side and the back side in the reflection plate 9 are also fused with partitioning walls 5.

Finally, a colored liquid is injected into the space A to obtain a display unit cell 100A of the invention.

Further, with reference to FIG. 4, moving of the colored liquid 11 and gradation display in the display unit cell 100A of the invention will be explained.

Figure 4A:
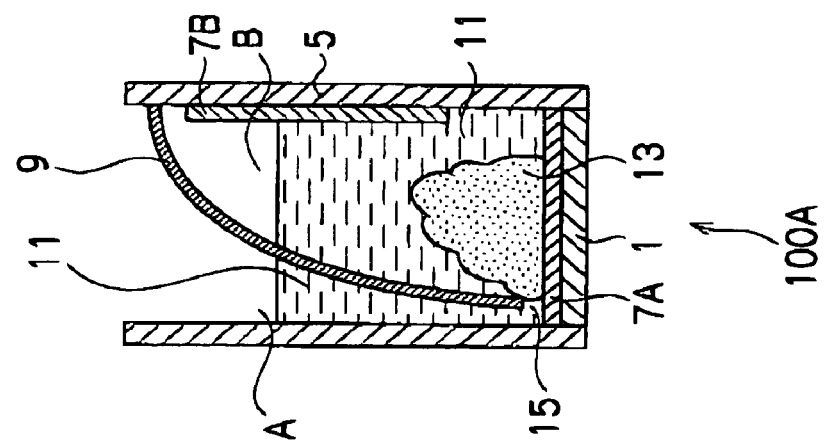
FIG. 4A to 4C are schematic cross-sectional views showing the moving state of the colored liquid in the display unit cell shown in FIG. 1.

FIG. 4A shows that the colored liquid 11 is stored in the space B and the coloration of the colored liquid 11 is in an invisible state. That is, the colored liquid 11 undergoes electroosmosis to the second electrode 7B side through the solid medium in which electroosmostic flow of liquid occurs when subjected to an electric field 13. Accordingly, the entire surface of the reflection layer 9 is exposed and in the case where the reflection plate 9 is white, the display unit cell 100A can display white color.

Figure 4B:
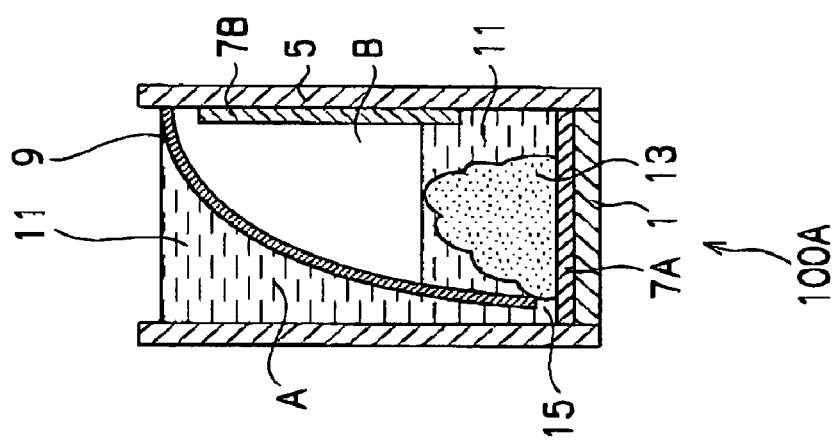

Further, FIG. 4B shows that the space A is fully filled with the colored liquid 11 and the reflection layer 9 is entirely made invisible. Herein, the colored liquid 11 undergoes electroosmosis to the first electrode 7A side through the solid medium in which electroosmostic flow of liquid occurs when subjected to an electric field 13. As a result, for example, in the case where the colored liquid 11 is black, the display unit cell 100A displays black color.

Figure 4C:
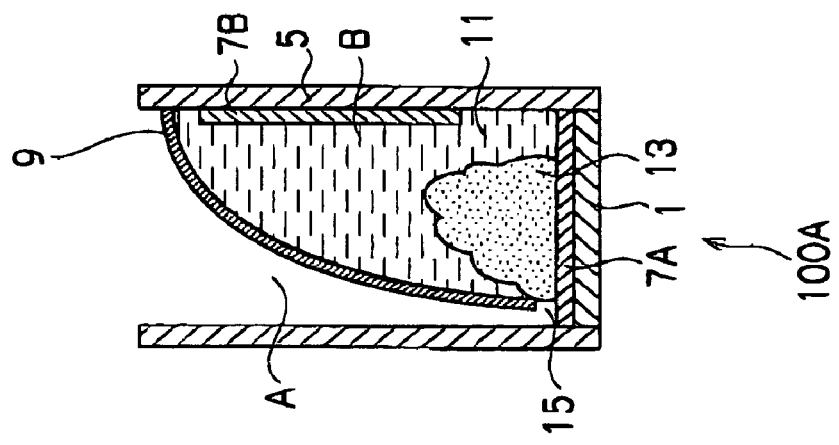

Further, FIG. 4C shows that the space A is partially filled with the colored liquid 11 and the reflection layer 9 is made partially visible. Herein, after the colored particles 11 are moved to form a desired interface surface area, the voltage application is stopped to keep that state.

Hereinafter, the respective components composing the display unit cell 100A will be described.

Substrate

A plate-like substrate made of a polymer material such as polyester, polyimide, poly(methyl methacrylate), polystyrene, polypropylene, polyethylene, nylon, poly(vinyl chloride), poly(vinylidene chloride), polycarbonate, polyether sulfone, cellulose derivative, and poly(ethylene terephthalate) (PET), and an inorganic substrate such as a glass substrate, a metal substrate and a ceramic substrate may be used as the substrate.

Among them, a substrate having transparency can be used as a transparent substrate forming the display surface.

A desired thickness of the substrate is properly determined in accordance with the transparency and the shape-keeping property and substantially, it is preferably 10 μm to 2 mm and it is more preferably 20 μm to 500 μm.

Electrode

As a material of the electrode (substrate), substantially, an electrode made of a metal film of such as copper, aluminum, silver, gold, nickel, platinum and metal oxide such as tin oxide-indium oxide (ITO) can be used. These materials may be used alone or two or more of them may be used in form of a mixture.

A desired size of the electrode is preferably 50 nm to 1 μm and more preferably 100 nm to 500 nm from a viewpoint of the efficiency and the productivity of the voltage application.

Partitioning Wall

The partitioning wall is a member forming the wall face of the display unit cell and the same materials for the substrate may be used for the material of the substrate.

The desired thickness of the partitioning wall may be determined property in accordance with the desired shape-keeping property and it is substantially preferably 1 to 500 μm and more preferably 20 to 200 μm.

Reflection Plate

The reflection plate may be made of the same material as that of the aforementioned substrate and is formed by coating the surface of the substrate with a visible light reflective material. The reflection plate is preferably white in terms of improvement of contrast and as a visible light reflection plate, titanium oxide, magnesium oxide, barium sulfate, calcium carbonate, and magnesium carbonate can be used.

Further, the thickness of the reflection plate is sufficient as long as it keeps the shape to form the space for holding the colored liquid and substantially it is preferably 1 to 500 μm and more preferably 20 to 200 μm.

The shape to dispose the reflection plate is determined according to the correlation of the capacity of the space A and the space B in FIG. 1 and the amount of the colored liquid 11. That is, the space B is needed at least to hold the entire amount of the colored liquid 11 and the space A is needed to produce a state that the space is fully filled with the colored liquid 11 and accordingly, the shape of the reflection plate forming the space B can be determined.

For example, as shown in FIG. 1, the reflection plate is disposed so as to form a recessed curved face to the displaying face of the reflection plate, so that the capacity of the space B can be larger than the space A and even if the amount of the colored liquid 11 which undergoes electroosmosis to the space A, the coating surface area of the reflection layer 9 can be made large and therefore, it is preferable.

As to a relationship of the capacity between the space A and the space B, it is preferable that the space A is made smaller than the space B.

Solid Medium in which Electroosmostic Flow of Liquid Occurs when Subjected to an Electric Field The solid medium in which electroosmostic flow of liquid occurs when subjected to an electric field is a medium for electroosmosis of the colored liquid and to efficiently exhibit the function, it is preferable to be disposed in the second space near the connection part with the first space.

As the solid medium in which electroosmostic flow of liquid occurs when subjected to an electric field, nitrocellulose, cellulose acetate, synthetic resin of their mixtures, PTFE (tetrafluoroethylene resin), packed fine particles, and glass capillary may be used.

The use amount of the solid medium in which electroosmostic flow of liquid occurs when subjected to an electric field may properly be determined in accordance with the amount of the colored liquid and the electroosmosis property and it is usually preferable to be 10 to 20% by volume to the colored liquid.

Colored Liquid

As a liquid composing the colored liquid, liquids conventionally well known as an electroosmosis liquid are used preferably. Practically, o-methacryloxypropyltrimethoxysilane, dimethyltriphenyltrimethoxysilane, phenyltrimethoxysilane and the like can be used.

As a coloring material to be used for the colored liquid, dyes and pigments may be used.

In the case where the colored liquid is colored to be black, examples of the dyes to be used are Nigrosine type dyes and examples of the pigments to be used are bronze powder, titanium black, and various kinds of carbon black (e.g. channel black and furnace black).

In the case where the colored liquid is colored to be chromatic colors, red, green, blue, cyan, magenta, and yellow color dyes may be used. Azo dyes, anthraquinone dyes, indigo dyes, phthalocyanine dyes, carbonium dyes, quinonimide dyes, methine dyes, quinoline dyes, nitro dyes, benzoquinone dyes, naphthoquinone dyes, naphthlimide dyes, and perinone dyes may be used. Further, for example, phthalocyanine type cyan pigments, benzidine type yellow pigments, rhodamine type magenta pigments, and other various kinds of color pigments of anthraquinone type, azo type, azo-metal complexes, phthalocyanine type, quinacridone type, perylene type, indigo type, isoindolinone type, quinacridone type, allylamide type, and zinc sulfide can be used.

Next, another example of a display device of the invention will be described with reference to FIG. 5.

FIG. 5 is a schematic cross-sectional view showing the second embodiment of the display unit cell of the display device of the invention. The second embodiment of the display unit cell is shows the display unit cell in the aforementioned third display device of the invention.

As shown in FIG. 5, the display device (display unit cell) 100B comprises the space B for holding the colored liquid 11 composed of the first electrode substrate 19, the third electrode substrate 23, and the partitioning wall 5. The space A is formed by the partitioning wall 5 and the curved reflection plate 9A. Further, in a lower part of the third electrode substrate 23, the second electrode substrate 21 is disposed. Herein, the reflection plate 9A shields the first electrode substrate 19 and the third electrode substrate 23 composing the space B. The first electrode substrate 19 is disposed in the state that it is kept a distance from the partitioning wall 5 in one side so as to form the connection path 15 for connecting the space A and the space B.

Herein, in FIG. 5, the third electrode substrate 23 is a film-like electrode substrate fixed in the partitioning wall in both ends and deformable in portions other than the ends. Partitioning walls (not illustrated) are disposed in the front side and the rear side in FIG. 5 and although the third electrode substrate 23 is brought into contact with the partitioning walls in the front surface and rear surface sides, it is not fixed.

In this structure, a space wherein the third electrode substrate 23 can be deformed is formed between the first electrode substrate 19 and the third electrode substrate 23 and between the second electrode substrate 21 and the third electrode substrate 23. Therefore, in the case where voltage is applied to the first electrode substrate 19 and the third electrode substrate 23 or in the case where voltage is applied to the second electrode substrate 21 and the third electrode substrate 23, the third electrode substrate 23 is deformed and the capacity of the space B is changed. As a result, the colored liquid 1 I can move between the space A and the space B through the connection path 15.

Accordingly, the horizontal projection surface area (the interface surface area of the colored liquid existing in the space A) of the display region in the space A can be adjusted.

In such second embodiment, the horizontal projection surface area adjustment device (the interface surface area adjustment device) can be composed of the first to the third electrode substrates 19, 21, and 23.

The movement of the colored liquid 11 in the second embodiment will be described practically.

Figure 5A:
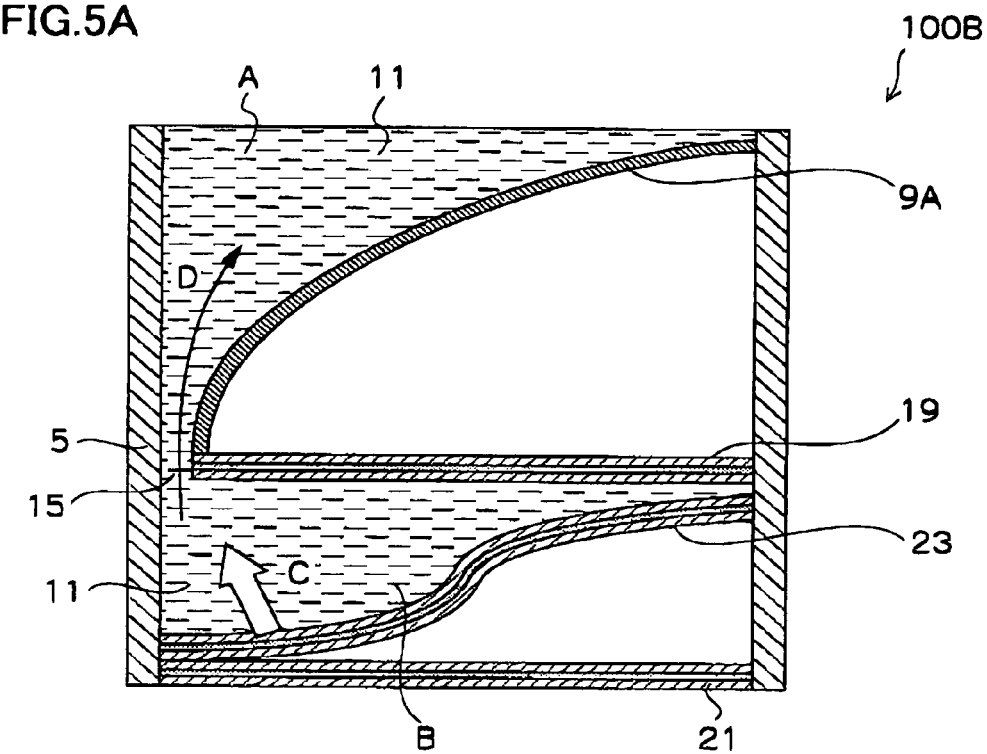
FIGS. 5A and 5B are schematic cross-sectional views showing a second embodiment of a display unit cell of the display device of the invention.

At first, when the voltage is applied between the first electrode substrate 19 and the third electrode substrate 23, the third electrode substrate 23 is attracted toward the first electrode substrate 19 from the portion gradually closer to the first electrode substrate 19 (in the direction shown by the arrow C). In this case, the capacity of the space B between the first electrode substrate 19 and the third electrode substrate 23 is decreased and the inner pressure is increased, the colored liquid 11 is pushed out in the direction as shown in the arrow D and moves to the space A side. As a result, corresponding to the amount of the colored liquid 11, which moves to the space A, the reflection plate 9A is covered. For example, in the case where the colored liquid 11 is colored to be black, the display unit cell 100B can express black gradation. In this connection, FIG. 5A shows the state that the space A is fully filled with the colored liquid 11 and in this case, the display unit cell 100B shows black.

Figure 5B:
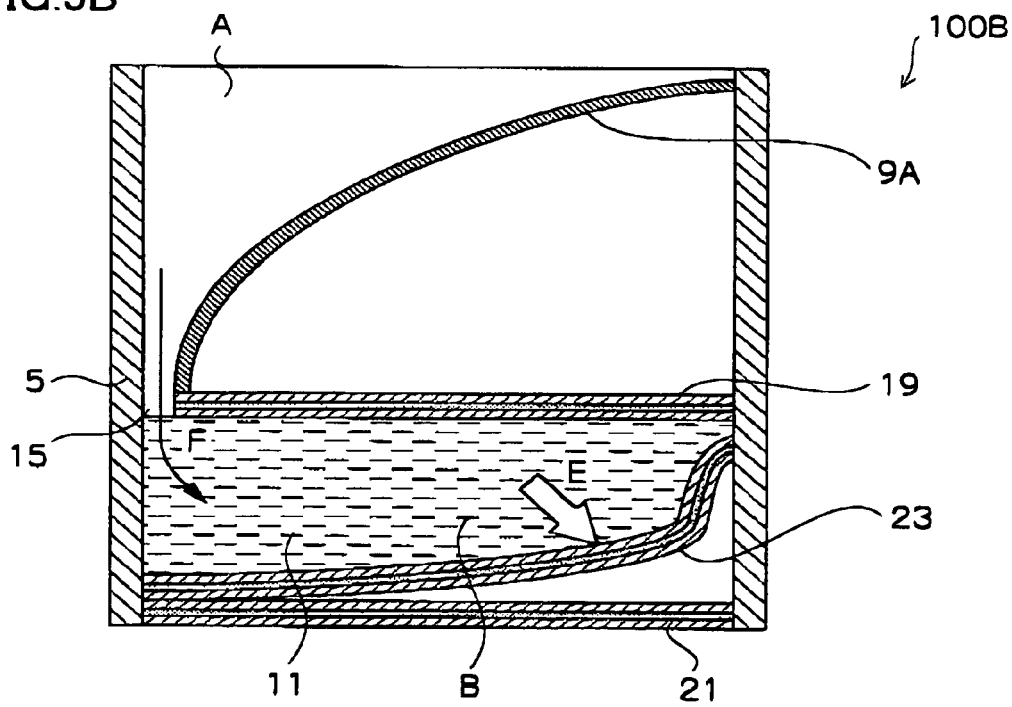

Further, if voltage is applied between the second electrode substrate 21 and the third electrode substrate 23, the third electrode substrate 23 is attracted toward the second electrode substrate 21 from the portion gradually closer to the second electrode substrate 21 (in the direction shown by the arrow E). Owing to the deformation, the capacity of the space B is increased and the colored liquid 11 is sucked in the direction as shown in the arrow F and moves to the space B side. Herein, FIG. 5B shows a state that the entire amount of the colored liquid 11 is housed in the space B and in this case, for instance, if the reflection plate 9 is white, the display unit cell 100B can display white color.

In such a manner, the capacity of the space B is changed by deforming the third electrode substrate 23 and thus the colored liquid 11 can move between the space A and the space B.

In the following, each member composing a display unit cell 100A will be described.

Electrode Substrate

The electrode substrate comprises an electrode disposed between substrate materials.

Examples of the substrate of an electrode substrate which is not deformed such as the aforementioned first electrode substrate 19 and second electrode substrate 21 may include plate-like substrates of polymer materials such as polyester, polyimide, poly(methyl methacrylate), polystyrene, polypropylene, polyethylene, nylon, poly(vinyl chloride), poly(vinylidene chloride), polycarbonate, polyether sulfone, cellulose derivative, and poly(ethylene terephthalate) (PET), and an inorganic substrate such as a glass substrate and a ceramic substrate. A monolayer or a film comprising a plurality of layers of a plurality of substances selected from copper, aluminum, chromium, tantalum, tungsten, molybdenum, indium tin oxide, and carbon, or a metal film is formed on the substrate or a film by a sputtering or an evaporation deposition method. The obtained substrate or the film becomes the electrode. The metal film may be used as it Is.

As the substrate of a deformable film-like electrode substrate which is deformable just like the aforementioned third electrode substrate 23, films of polymer materials such as polyester, polyimide, poly(methyl methacrylate), polystyrene, polypropylene, polyethylene, nylon, poly(vinyl chloride), poly(vinylidene chloride), polycarbonate, polyether sulfone, cellulose derivative, fluoro resin, and poly(ethylene terephthalate) (PET) are preferable in terms of the electric properties ad production easiness. A monolayer or a film comprising a plurality of layers of a plurality of substances selected from copper, aluminum, chromium, tantalum, tungsten, molybdenum, indium tin oxide, and carbon, or an alloy film is formed by a sputtering or an evaporation deposition method. It becomes the electrode. The metal film may be used as it is.

Further, it is preferable from a viewpoint of electric stability, the aforementioned metal film or the electrode formed on the substrate or film is coated with an insulating substance. Substances to be used as the insulating substrate may include epoxy resin, silicone resin, acrylic resin, and $SiO_2$.

From a viewpoint of the electric stability, an electrode usable as the aforementioned electrode substrate may be a laminate obtained by laminating the electrode on a substrate or a film, for example a laminate obtained by laminating a copper electrode on a material with PET.

Next, another example of the display device of the invention will be described with reference to FIG. 6.

FIG. 6 shows a schematic cross-sectional view showing the third embodiment of the display unit cell of the display device of the invention. The third embodiment of the display unit cell shows the display unit cell of the aforementioned fourth display device of the invention.

As shown in FIG. 6, the display device (display unit cell) 100C has a structure formed by disposing a driving unit 29 for the movable substrate 25 on the back surface substrate 27 and disposing the movable substrate 25 on the driving unit 29. A tapered colored substance 31 is disposed on the movable substrate 25 and a penetrable white plate 33 is disposed while it is brought into contact with the tapered colored substance 31. The penetrable white plate 33 is fixed in the partitioning wall 5 in both ends.

The movable substrate 25 is enabled to move in the vertical direction by the driving unit 29. Therefore, the tapered colored substance 31 can move vertically synchronously with the movable substrate 25.

A through hole 33H corresponding to the shape of the tapered colored substance 31 is disposed in the penetrable white plate 33. The through hole 33H is usually invisible and the coloration of the tapered colored substance 31 is made observable from an observation side by vertical transportation of the tapered colored substance 31 through the through hole 33H. In accordance with the penetration state of the tapered colored substance 33, the horizontal projection surface area in the display region (the interface surface area of the colored liquid existing in the space A) can be adjusted.

In the third embodiment with such a structure, the horizontal projection surface area adjustment device (the interface surface area adjustment device) is composed of the movable substrate 25 and the driving unit 29.

The movement of the tapered colored substance 31 in the third embodiment will be described particularly.

Figure 6A:
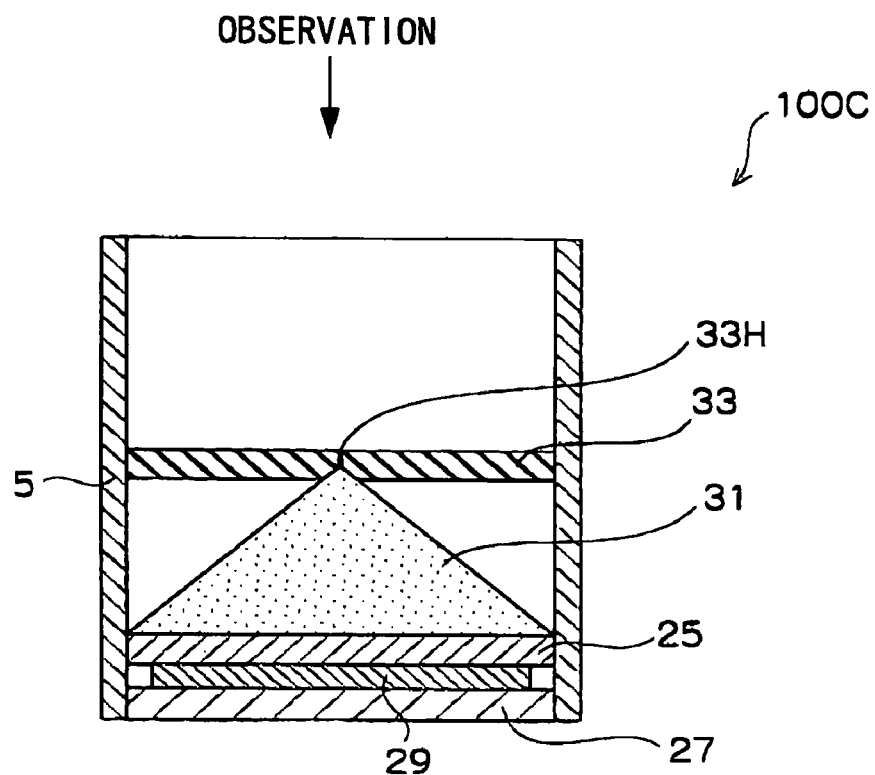
FIGS. 6A and 6B are schematic cross-sectional views showing a third embodiment of a display unit cell of the display device of the invention.

At first, as shown in FIG. 6A, in the case where the tapered colored substance 31 does not penetrate the through hole 33H of the penetrable white plate 33, that is, in the case where the tapered colored substance 31 is shielded with the penetrable white plate 33, the display unit cell 100C displays white color.

Figure 6B:
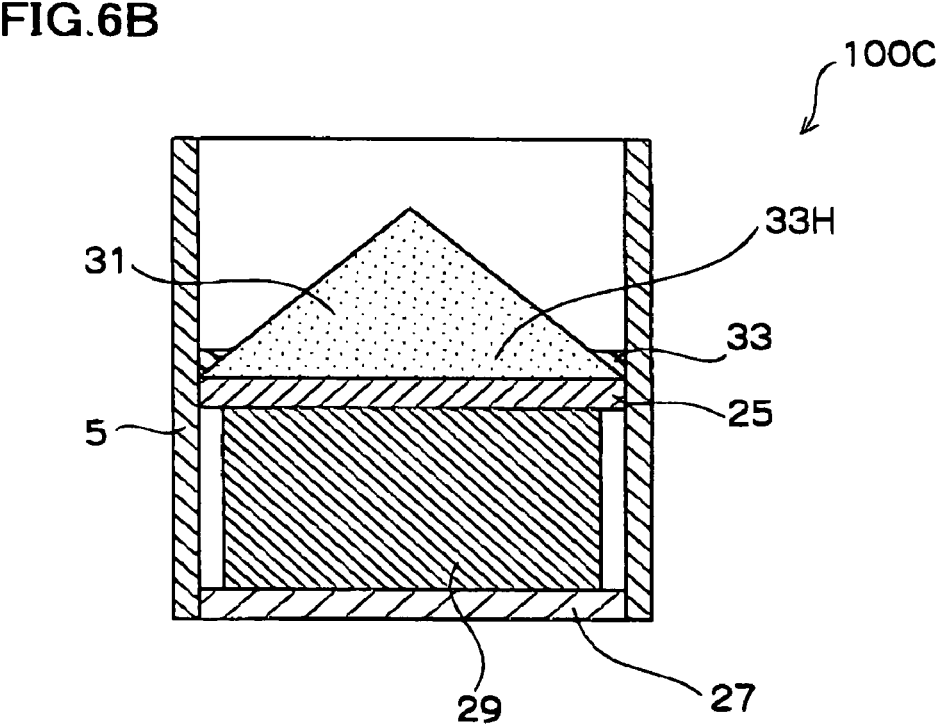

When the movable substrate 25 is vertically moved to the penetrable white plate 33 side by the driving means 29, the tapered colored substance 31 passes through the through hole 33H of the penetrable white plate 33. In this case, the region of the penetrable white plate 33 is changed depending on the degree of penetration of the tapered colored substance 31. Accordingly, in the case where the tapered colored substance 31 is colored to be black, the display unit cell 100C can express black gradation. FIG. 6B shows the state that the tapered colored substance 31 entirely passes through the through hole 33H of the penetrable white plate 33 and in this case, the display unit cell 100C can display black color.

Herein, in the third embodiment, the case the back surface substrate is fixed and the movable substrate is made movable is explained, and as another embodiment, the movable device and the tapered colored substance may be disposed on the penetrable white plate. Also, the tapered colored substance may be fixed and the penetrable white plate may be made movable.

Hereinafter, the respective components composing the display unit cell 100C will be described.

Movable Substrates

A substrate usable as the movable substrate may include plate-like substrates of polymer materials such as polyester, polyimide, poly(methyl methacrylate), polystyrene, polypropylene, polyethylene, polyamide, nylon, poly(vinyl chloride), poly(vinylidene chloride), polycarbonate, polyether sulfone, silicone resin, polyacetal resin, fluoro-resin, cellulose derivative, polyolefine, and poly(ethylene terepbthalate) (PET), and an inorganic substrate such as a glass substrate, a metal substrate, and a ceramic substrate.

Driving Device

As the driving unit, various kinds of actuators (various types of electromagnetic, air pressure, electrostatic, shape-memory alloy type, piezoelectric, optical, ultra magnetostriction type, polymer gel, and piezoelectric elements) can be utilized. Further, a positioning apparatus to generate linear movement can be utilized. Practically, for example, a positioning apparatus in a screwing transportation system can be utilized. Further, a rack pinion drive or a belt or chain drive positioning apparatus, or a positioning apparatus utilizing a piston-crank mechanism or a cam mechanism positioning apparatus can be used.

Tapered Colored Substrate

Materials for that of the tapered colored substance may be usable as long as they are harder materials than the penetrable white plate and these materials are colored with various kinds of pigments and dyes to produce the tapered colored substance. Materials composing the tapered colored substance may include polymer materials such as polyester, polyimide, poly(methyl methacrylate), polystyrene, polypropylene, polyethylene, polyamide, nylon, poly(vinyl chloride), poly (vinylidene chloride), polycarbonate, polyether sulfone, silicone resin, polyacetal resin, fluoro resin, cellulose derivative, and polyolefin and inorganic substrate of such as glass, a metal substrate, and a ceramic substrate.

Penetrable White Plate

A film-like material, which is produced by using a mixture of a penetrable material such as a rubber material, and a white material, can be used as the penetrable white plate. The material to be used for the rubber material of the penetrable white plate may be various kinds of conventionally well known natural rubber materials and synthetic rubber materials. The synthetic rubber is not particularly limited if it is conventionally known synthetic polymers and examples are styrene-butadiene rubber, polyisoprene rubber, polybutadiene rubber, nitrile rubber, chloroprene rubber, butyl rubber, Hypalon, silicon rubber, urethane rubber, ethylene-propylene rubber, fluoro rubber, acryl rubber, and epichlorohydrin rubber.

As the white material, materials excellent in the reflection property are preferable and titanium oxide, magnesium oxide, barium sulfate, calcium carbonate, and magnesium carbonate can be used.

EXAMPLES

Hereinafter, the present invention will be described in further detail with examples. However, the invention is not limited to the illustrated examples.

Example 1

A display unit cell shown in FIG. 1 is produced through the steps shown in FIG. 3 as follows.

At first, a component is produced by forming an ITO electrode (a first electrode 7A) with a thickness of 100 nm on a PET substrate (a back surface substrate 1) with a size of 500 μm×500 μm and a thickness of 20 μm. Further, a component is produced by pattern-wise forming an ITO electrode (a second electrode 7B) with a thickness of 100 nm on a PET substrate (a partitioning wall 5) with a size of 540 μm×540 μm and a thickness of 20 μm. These two members are vertically stuck to each other by heating as shown in FIG. 3A. In this case, in relation to the PET substrate corresponding to the back surface substrate 1, the PET substrates corresponding to the partitioning wall 5 are projected by 20 μm each in the front side and the rear side in FIG. 3.

As shown in FIG. 3B, a solid medium in which electroosmostic flow of liquid occurs when subjected to an electric field 13 of a tetrafluoroethylene resin is disposed on the ITO electrode corresponding to the first electrode 7A while it is brought into contact with the connection path 15, and further a white reflection plate 9 with a thickness of 50 μm comprising a PET substrate coated with titanium oxide is formed thereon so as to cover it. In this case, the solid medium in which electroosmostic flow of liquid occurs when subjected to an electric field 13 is disposed so as to occupy 80% by volume of the space B. One side of the reflection plate is fused with the PET substrate corresponding to the partitioning wall 5 and the other side is disposed so as not to contact the ITO electrode in order to form the connection path 15.

Subsequently, as shown in FIG. 3D and (d), partitioning walls of PET substrates with a size of 500 μm×540 μm and a thickness of 20 μm are fused with the sides of the PET substrate corresponding to the back surface substrate 1 other than the side previously formed in the partitioning wall 5. In this case, both sides in the front side and the rear side in FIG. 1 of the reflection plate 9 are fused with the partitioning walls 5.

Accordingly, the ratio by volume of the space A to the space B in FIG. 1 is 35:65

As shown in FIG. 4C, 0.08 μL of a colored liquid 11 mixing 3% by mass of C.I. Direct black 168 as a coloring material with o-methacryloxypropyltrimethoxysilane as an electroosmosis liquid is injected and after that, a transparent substrate 3, a PET substrate with a size of 500 μm×500 μm and a thickness of 20 μm, is disposed on the top surface to form the display unit cell 100A shown in FIG. 1.

When negative voltage is applied to the ITO electrode corresponding to the first electrode 7A using an outer electrode 17 to the obtained display unit cell, the colored liquid 11 undergoes electroosmosis to the first electrode 7A side through the solid medium in which electroosmostic flow of liquid occurs when subjected to an electric field 13. As a result, as shown in FIG. 4B, the colored liquid 11 completely covers the reflection plate 9 and the display pixel displays black color. The optical density of the display unit cell at that time is measured by X-Rite 404 which shows that the value is 1.69.

When negative voltage is applied to the ITO electrode corresponding to the second electrode 7B, the colored liquid 11 covering the reflection plate 9 undergoes electroosmosis to the second electrode 7B side through the solid medium in which electroosmostic flow of liquid occurs when subjected to an electric field 13. As a result, as shown in FIG. 4A, the colored liquid 11 is entirely stored in the space B shielded with the reflection plate 9 and the display pixel displays white color. The optical density of the display unit cell at that time is measured which shows that the value is 0.08.

Accordingly, it is found that the obtained display unit cell can show excellent Contrast.

Example 2

A display unit cell shown in FIG. 5 is produced as follows.

An ITO electrode with a thickness of 100 nm is formed on a PET substrate with a size of 500 μm×500 μm and a thickness of 20 μm, and a $SiO_2$ film is formed on the ITO electrode to form a second electrode substrate 21. Also, a first electrode substrate 19 is produced in the same manner as the aforementioned second electrode substrate 21, except the size of the PET substrate is changed to be 500 μm×495 μm.

Also, copper is deposited in a thickness of 1 μm on a PET substrate with a size of 500 μm×800 μm and a thickness of 10 μm, and the electrode face is further coated with a 10 μm-thick PET to produce a film-like electrode as a third electrode substrate 23.

At first, one side of the second electrode substrate 21 is fused to the edge of the PET substrate with a size of 540 μm×800 μm and a thickness of 20 μm corresponding to the partitioning wall 5 in the right side in FIG. 5, and one side of the first electrode substrate 19 is fused at a point parted from the second electrode 21 at 500 μm and further one side of the third electrode substrate is fused at a point in the vicinity of the first electrode substrate 19. In this case, the first electrode substrate 19 and the second electrode substrate 21 are fused with each other in a manner so that the $SiO_2$ films of them are set face to face and the distance between both electrode substrates is adjusted to be 500 μm. At the time of fusion, the PET substrate corresponding to the partitioning wall 5 is projected out by 20 μm each in the front side and the rear side in FIG. 5.

Subsequently, another side of the second electrode substrate 21 corresponding to the partitioning wall 5 in the left side in FIG. 5 is fused with the terminal end of the PET substrate with a size of 540 μm×800 μm and a thickness of 20 μm corresponding to the partitioning wall 5 in the left side in FIG. 5, and further another side of the third electrode substrate 23 is fused with the edge part of the second electrode substrate while it is brought into contact with the edge part. Herein, "another side" in the second electrode substrate 21 is the side opposite to one side fused to the PET substrate corresponding to the partitioning wall 5 in the right side in FIG. 5. Also in this case, the first electrode substrate 19 is kept a distance from a contact with the PET substrate corresponding to the partitioning wall 5 in the left side in FIG. 5 and as a result, a connection path 15 is formed between the partitioning wall 5 in the left side and the first electrode substrate 19 in FIG. 5.

After that, a white reflection plate 9 with a thickness of 50 μm comprising a PET substrate coated with titanium oxide is disposed on the upper part of the first electrode substrate 19 so as to cover the first electrode substrate 19. Herein, as shown in FIG. 5, the reflection plate 9 is fused with the PET substrate corresponding to the partitioning wall 5 in the right side in FIG. 5 and another side is fused with the terminal end of the left side of the first electrode substrate 19 in FIG. 5.

Subsequently, PET substrates with a size of 500 μm×800 μm and a thickness of 20 μm are fused to both sides of the second electrode substrate 21 in the front side and the rear side in FIG. 5 to form partitioning walls (not illustrated). In this case, both sides of the first substrate 19 of the reflection plate 9 in the front side and the rear side in FIG. 5 are also fused with the PET substrate. Further, both sides of the third electrode substrate 23 in the front side and the rear side in FIG. 5 are brought into contact with the PET substrate but not fixed.

Accordingly, the volume ratio of the formed space A to space B in FIG. 5 is 1:5.

Thereafter, 0.1 μL of a colored liquid 11 obtained by mixing 3% by mass of C.I. Direct black 168 as a coloring material with γ-methacryloxypropyltrimethoxysilane as an electroosmosis liquid is injected and after that, a transparent substrate (not illustrated), a PET substrate with a size of 540 μm×540 μm and a thickness of 20 μm, is disposed on the top surface to form the display unit cell 100B shown in FIG. 5.

When voltage is applied between the first electrode substrate 19 and the third electrode substrate 23, the colored liquid 11 moves to the space A and covers the reflection plate 9A, so that the display pixel can display black color. The optical density at that time is measured by X-Rite 404 which shows that the value is 1.70.

When voltage is applied to the second electrode substrate 21 and the third electrode substrate 23, the colored liquid 11 covering the reflection plate 9A moves to the space B and the display pixel can display white color. The optical density of the display unit cell at that time is measured which shows that the value is 0.09.

Accordingly, it is found that the obtained display unit cell can show excellent contrast.

Example 3

The display unit cell shown in FIG. 6 is produced as follows.

A piezoelectric element (a driving unit 29) is disposed on a PET substrate (a back surface substrate 27) with a size of 500 μm×500 μm and a thickness of 20 μm in a manner so that it can move vertically relative to the substrate surface. A tapered object (a tapered colored substance 31) made of an ebonite and having a size of 450 μm×450 μm and a height of 45 μm is fixed on the piezoelectric element through a PET substrate (a movable plate 25) with a size of 500 μm×500 μm and a thickness of 20 μm.

After that, PET substrates with a size of 540 μm×160 μm and a thickness of 20 μm are fused to both sides of the second electrode substrate corresponding to the back surface substrate 27 in the right side and the left side in FIG. 6 to form partitioning walls 5. In this case, both sides in the right and left sides of the movable substrate 25 in FIG. 6 are fused with the PET substrate (the partitioning wall 5). At the time of fusion, the PET substrate corresponding to the partitioning wall 5 is projected by each 20 μm out of the PET substrate corresponding to the back surface substrate 27 and the movable substrate 25 in each the front side and the rear side in FIG. 6.

A penetrable plate, i.e., a styrene-butadiene rubber plate having a 10 μm-thick titanium oxide (penetrable white plate 33) having a through hole 33H is disposed in a position where the summit in the upper part of the black tapered object can be concealed and two sides (both right and left sides in FIG. 6) of it are fixed in the partitioning wall 5.

Subsequently, PET substrates with a size of 500 μm×160 μm and a thickness of 20 μm are fused to both sides of the PET substrate corresponding to the back surface substrate 27 in the front side and the rear side in FIG. 6 to form partitioning walls (not illustrated). In this case, both sides of the movable substrate 25 and the penetrable white plate 33 in the front side and the rear side in FIG. 6 are also fused with the PET substrate.

After that, a transparent substrate (not illustrated) of a PET substrate with a size of 540 μm×540 μm and a thickness of 20 μm is formed on the top surface to produce a display unit cell 100C.

When the black tapered substance is moved toward the penetrable white plate 33 (in other words, moved upward in FIG. 6), since the black tapered substance passes through the through hole 33H of the penetrable white plate 33, the display pixel can display black color. The optical density at that time is measured by X-Rite 404 which shows that the value is 1.6.

Thereafter, when the black tapered substance is moved toward the back surface substrate 1 (in other words, moved downward in FIG. 6), since the black tapered substance pulled out of the through hole 33H of the penetrable white plate 33, only the penetrable white plate 33 is observed and the display pixel can display white color. The optical density at that time is measured which shows that the value is 0.09.

Accordingly, it is found that the obtained display unit cell can show excellent contrast.

Accordingly, the invention can provide a display device capable of rewriting and giving excellent reflectivity and contrast, and a display method.

The display device and the display method are suitable for electronic paper display systems.

What is claimed is:

1. A display device comprising display unit cells having:
   a colored liquid;
   a first space capable of holding the colored liquid in a visible state;
   a second space connecting with the first space, shielded with a reflection plate, and capable of holding the colored liquid in an invisible state; and
   an interface surface area adjustment unit that relatively changes the interface surface area of the colored liquid held in the first space by increasing or decreasing the amount of the colored liquid held in the second space;
   wherein the interface surface area adjustment unit comprising:
   a pair of electrodes provided in the second space; and
   a solid medium in which electroosmostic flow of liquid occurs when subjected to an electric field in which the colored liquid can undergo electroosmosis,
   and the interface surface area adjustment unit moves the colored liquid between the first space and the second space through the solid medium in which electroosmostic flow of liquid occurs when subjected to an electric field by a voltage applied between the pair of electrodes.

2. The display device of claim 1, wherein the solid medium in which electroosmostic flow of liquid occurs when subjected to an electric field is disposed at a position in the second space, and the position connects with the first space.

3. The display device of claim 1, further comprising a voltage applying unit that applies a voltage between the pair of electrodes.

4. A display device comprising display unit cells having:
a colored liquid;
a first space capable of holding the colored liquid in a visible state;
a second space connecting with the first space and capable of holding the colored liquid in an invisible state;
a third space including the second space and shielded with a reflection plate; and
an interface surface area adjustment unit that relatively changes the interface surface area of the colored liquid held in the first space by increasing or decreasing the amount of the colored liquid held in the second space;
wherein the interface surface area adjustment unit comprising:
a first electrode substrate and a second electrode substrate disposed face to face in the third space; and
a deformable third electrode substrate disposed between the first electrode substrate and the second electrode substrate,
and the second space is formed between the first electrode substrate and the third electrode substrate, and the interface surface area adjustment unit moves the colored liquid between the first space and the second space by deforming the third electrode substrate by a voltage applied between the first electrode substrate and the second electrode substrate.

5. The display device of claim 4, further comprising a voltage applying unit that applies a voltage between the pair of electrodes.

6. A display device comprising display unit cells having:
a colored substance;
a first space capable of holding the colored substance in a visible state;
a second space connecting with the first space, shielded with a penetrable plate, and capable of holding the colored substance in an invisible state; and
a horizontal projection surface area adjustment unit that relatively changes the horizontal projection surface area of the colored substance held in the first space by changing the amount of the colored substance held in the second space,
wherein the horizontal projection surface area adjustment unit comprising:
a movable substrate connected to the colored substance; and
a driving unit that moves the movable substrate,
and the horizontal projection surface area adjustment unit moves the colored substance between the first space and the second space by moving the movable substrate.

7. The display device of claim 6, wherein the penetrable plate contains a reflective material.

* * * * *